United States Patent [19]

Cullum

[11] Patent Number: 5,557,355
[45] Date of Patent: Sep. 17, 1996

[54] HIGH OUTPUT MAGNETIC HEAD WITH SMALL PHYSICAL DIMENSIONS

[75] Inventor: Dennis F. Cullum, Leucadia, Calif.

[73] Assignee: Eastman Kodak Company, Rochester, N.Y.

[21] Appl. No.: 316,999

[22] Filed: Oct. 3, 1994

[51] Int. Cl.⁶ .......................... G03B 17/24; G11B 5/235; G11B 5/187; G11B 5/147
[52] U.S. Cl. .......................... 354/106; 360/120; 360/126; 360/122
[58] Field of Search .................. 354/106; 360/119, 360/120, 121, 122, 126

[56] References Cited

U.S. PATENT DOCUMENTS

| | | |
|---|---|---|
| 3,663,767 | 5/1972 | Shimotori et al. |
| 4,398,229 | 8/1983 | McClure ................... 360/119 |
| 4,550,492 | 11/1985 | Lemke ..................... 360/121 |
| 4,775,909 | 10/1988 | Inoue et al. ............... 360/122 |
| 4,847,715 | 7/1989 | Kumasaka et al. ........... 360/122 |
| 5,001,590 | 3/1991 | Saito et al. ............... 360/120 |
| 5,212,612 | 5/1993 | Kobayashi et al. .......... 360/119 |
| 5,321,452 | 6/1994 | Tsujimoto . |
| 5,436,781 | 7/1995 | Matono et al. ............. 360/126 |

Primary Examiner—David M. Gray
Assistant Examiner—Michael Dalakis
Attorney, Agent, or Firm—Peter J. Bilinski

[57] ABSTRACT

A magnetic head for a camera having a track-forming portion for at least reading information from a magnetic memory region of a film associated with the camera wherein the track forming portion includes an improved core forming a magnetic circuit and having a pair of pole pieces characterized in that each of the pole pieces is generally flat with arms extending to one side of spaced coil winding areas and the pole pieces are placed at a substantial angle with ends of front and rear arms of the two pole pieces closely opposed, the front pair of ends being spaced to form a non-magnetic gap. Thickness of the magnetic circuit near the gap is reduced by recesses in the adjacent front arms preferably filled by non-magnetic inserts that support the narrowed arms during contouring of the ends to further define the gap depth and form a contact surface for the film track. Angling of the pole pieces provides a low height core with coils lying parallel with the film surface but made from simple flat pole elements. Angling of the opposing ends of the rear arms increases contact area of the arm ends for improved core efficiency.

17 Claims, 3 Drawing Sheets

5,557,355

1
HIGH OUTPUT MAGNETIC HEAD WITH SMALL PHYSICAL DIMENSIONS

FIELD OF THE INVENTION

This invention relates generally to the field of photography, and in particular, to a camera for use with a film having a magnetic memory region. Specifically, the invention relates to a high output inductive magnetic head configuration of low height that permits writing to and reading from magnetic track positions on a film and to an improved core configuration for use with a track-forming portion of such a magnetic head.

BACKGROUND OF THE INVENTION

U.S. patent application Ser. No. 08/241,535, filed May 12, 1994, and assigned to the assignee of the present invention, discloses a camera having a high output inductive magnetic head including a first track-forming portion for at least reading information from a magnetic memory region of a film and a second track-forming portion for writing information onto the magnetic memory region of the film. A core of the first track-forming portion has magnetic pole portions extending parallel to the plane of the film to minimize the height of the head and the resulting size of the camera. This permits winding coils with a large number of turns on the poles for reading information from the film without increasing the height of the core; however the shape of the core is complicated so that manufacturing is relatively difficult.

SUMMARY OF THE INVENTION

The present invention is directed to a camera having a magnetic head with low height and generally small physical dimensions wherein an improved track-forming portion is provided having a core made up of generally flat easily manufacturable laminated pole pieces with supporting inserts. The pole pieces are disposed in the magnetic head at an angle to one another so as to provide a gap at a film engaging surface of the head for contacting the memory region of the film while the coil winding portions are spaced at a lower level within the head and extend with their coils in a direction parallel to the surface of the film.

An advantageous aspect of the present invention is that the thickness of the core is not limited by a minimum bend radius for laminations, since the laminated pole pieces are flat.

A further advantageous aspect of the present invention is that the rear gap of the pole pieces, where the rear legs of the core contact, has a contact surface increased by angular engagement of the pole pieces which contributes to improved core efficiency.

A still further advantageous aspect of the present invention is that non-magnetic inserts fixed in recesses at the primary gap ends of the core legs facilitate machining and support of the gap structure during construction of the head.

Another advantage realized by the present invention is that the depth of the primary gap at the film contacting portion of the core may be established from measurement of the exposed face of the core lamination, since the gap depth and the length of the exposed core in the direction of film travel are geometrically related.

2

A still further advantageous aspect of the present invention is that relatively hard magnetic alloys may be used in the core, since the use of flat laminations avoids the need for bending in the construction of the pole pieces.

These and other features and advantages of the invention will be more fully understood from the following Detailed Description of the Invention taken together with the accompanying Drawings.

DETAILED DESCRIPTION OF THE INVENTION

Figure 1:
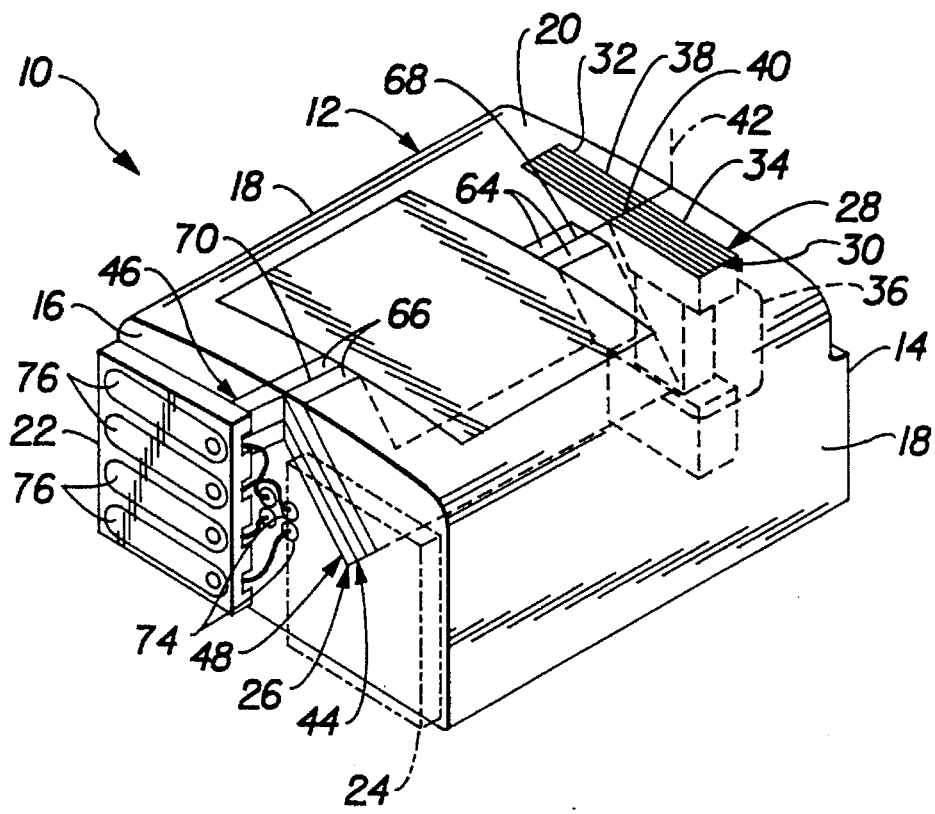
FIG. 1 is a pictorial view of a magnetic head exemplifying the invention, partially broken away to show a portion of a first core.
Figure 2:
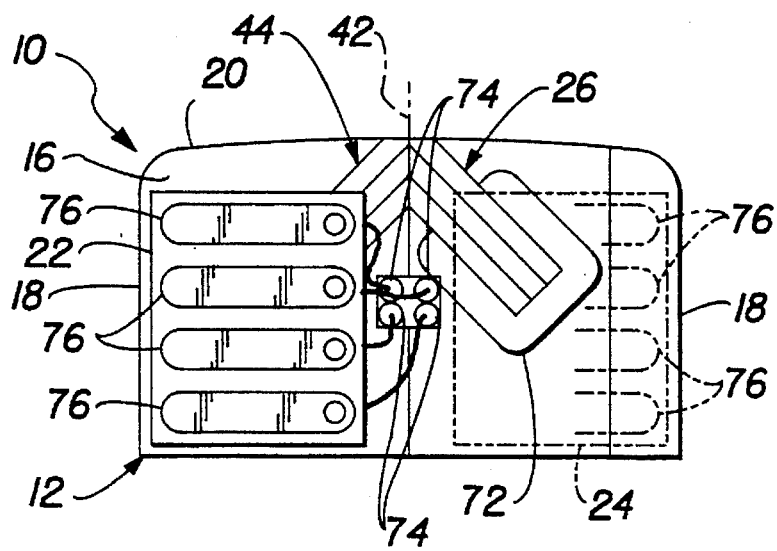
FIG. 2 is a terminal end view of the magnetic head of FIG. 1 partially broken away to further illustrate the first core construction.

Referring first to FIGS. 1 and 2 of the drawings in detail, numeral 10 generally indicates a high output inductive magnetic reproducing head for use in a camera for reading information from or writing information to a magnetic memory portion of a film used in the camera. The magnetic head 10 includes a case 12 of non-magnetic material, such as aluminum, having inner and outer ends 14, 16, respectively, and a pair of sides 18 merging with a slightly arched contact surface 20. A pair of terminal boards 22, 24 are mounted on the outer end 16 of the case 12. Within the case 12 are mounted first and second track-forming portions 26, 28, respectively, retained in an appropriate manner such as by a suitable potting compound.

The second track-forming portion 28 is of generally conventional construction including a flat laminated core 30 formed as an assembly of left and right pole pieces 32, 34, respectively. Both pole pieces 32, 34 are generally flat, except for recessed portions of the coil winding area, on one or both of which coils 36 are wound. Outward of the coils, the pole pieces 32, 34 include laterally inwardly extending arms that lie in closely opposed relation to one another. The two pole pieces are arranged to lie in a common plane to form the flat core 30. One end 38 of the core 30, formed by opposing arms of the two pole pieces 32, 34 extends through and lies flush with the arched contact surface 20 of the head 10. A non-magnetic gap 40 is formed between ends of the arms of the pole pieces 32, 34 and lies along a central plane 42 of the head at the surface 20 for transferring inductive signals from the second track-forming portion 28 to an associated film, all in a known manner.

Because the axes of the coils 36 wound on the poles of core 30 lie generally normal, or perpendicular, to the planes of the contact surface 20 and the associated film on which magnetic information is to be written and the available thickness of the associated camera in this direction is limited, the length of the pole pieces 32, 34 on which coils can be wound is also limited. Thus winding of coils with a large number of turns is not easily accommodated with this type of core arrangement.

Figure 3:
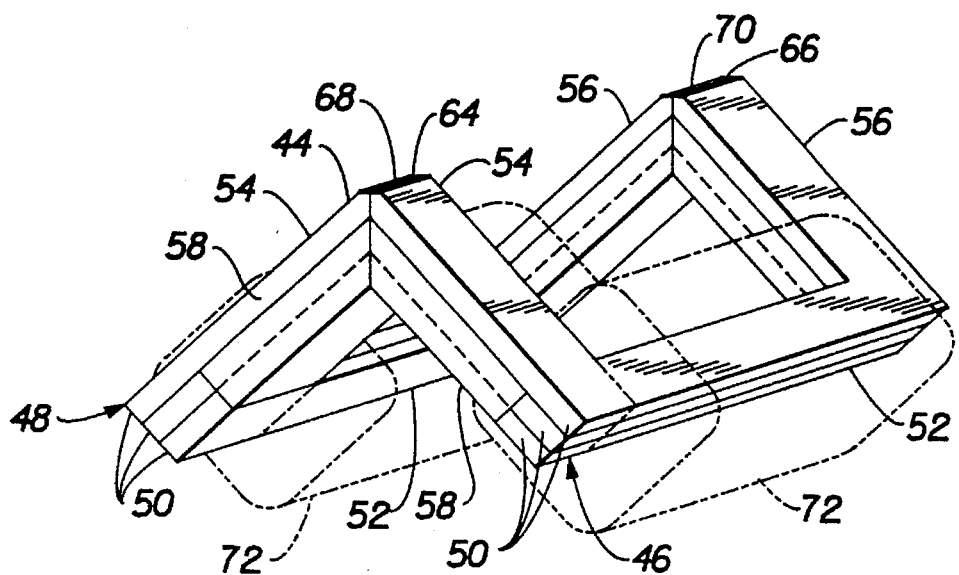
FIG. 3 is a pictorial view of the first core assembly shown in its assembled position but outside of the case.

The first track-forming portion 26 differs significantly from the conventional portion 28 in providing a novel core 44, best shown in FIG. 3 (in reverse orientation to that of FIG. 1). The core 44 comprises two separate pole pieces 46, 48 disposed relative to one another at a substantial angle, preferably a right angle as will be subsequently more fully discussed.

Figures 4, 5:
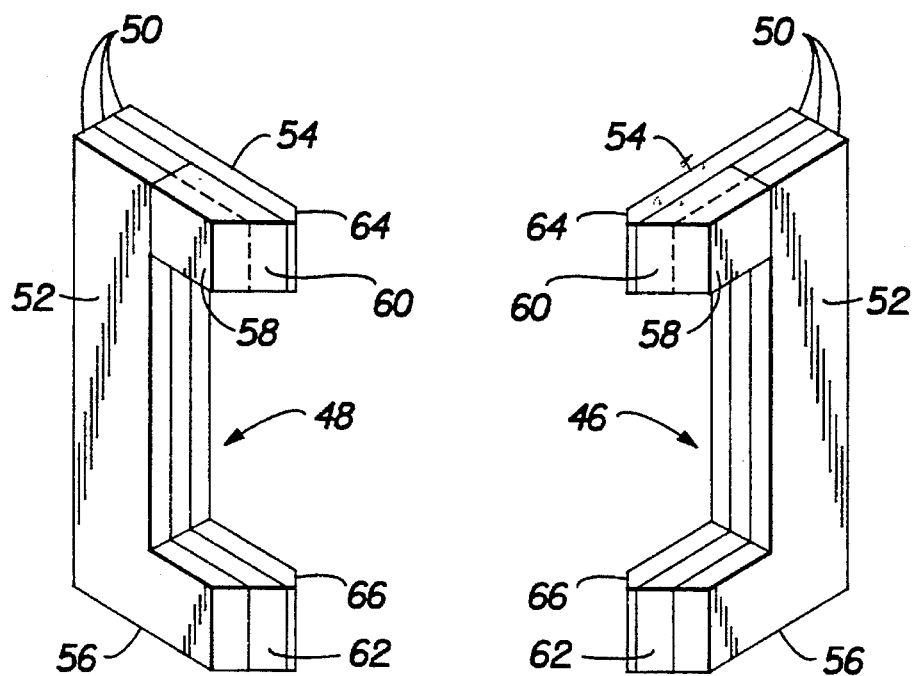
FIGS. 4 and 5 are pictorial views of right and left pole pieces of the core assembly of FIG. 3.

Pole pieces 46, 48, respectively, referred to as left and right pole pieces as they are shown in FIG. 1, are shown in detail in FIGS. 5 and 4, respectively. Each of the pole pieces 46, 48 are formed from a suitable number of flat metallic laminations 50 of magnetic material, such as HyMu 80, Permalloy, Sendust or other suitable magnetic alloys. Each pole piece 46, 48 is of preferably flat configuration having laterally extending spaced portions 52. As installed, portions 52 extend laterally of the direction of film motion and generally parallel with the film medium and the contact surface 20 of the head 10. At either end of the spaced portions 52, each pole piece 46, 48 has side-extending arms, including a first arm 54 and a generally parallel second arm 56. Thus the pole pieces 46, 48 are formed as essentially flat C-shaped members which are mirror images of one another.

On the lower sides, as installed, of the first arms 54, recesses are provided which are filled with non-magnetic inserts 58 that may be laminated if desired. The recesses may be formed by cutting away or omitting all or part of the laminations forming the lower sides of the first arms and may extend for all or part of the lengths of these arms. The inserts 58 may be cemented or otherwise retained and preferably fill these recesses so that the pole pieces 46, 48 maintain their preferred flat configurations.

As is shown in FIGS. 1–3, the two pole pieces 46, 48 when assembled to form the core 44, are disposed at an angle to one another of preferably 90 degrees, although other angular positions could be used if desired. The pole pieces 46, 48 are located so that ends 60, 62 of the first and second arms respectively are disposed in closely opposed relation to corresponding ends of the arms of the opposite pole piece. To accommodate this, major portions of the ends 60, 62 of the arms are formed at an angle to the planes of the laminations forming the respective pole pieces. As illustrated, the angle of the ends is about 45 degrees, or one half the angle between the pole pieces forming the core 44. If desired, however, variations in the value and shape of the end angles may be made to accommodate differing forms of the core 44 and its dual pole pieces 46, 48.

As installed in the case 12, upper portions of the ends 60, 62 of the arms, including part only of the remaining magnetic portions of the first arms and equivalent portions of the second arms, are contoured to form flat contact portions 64, 66 which extend through and form a part of the contact surface 20 of the case. The contact portions 64 of the first arms 54 are adapted to be contacted by the associated film for inductively reading from or writing to a track on the film aligned with the contact portions. The ends 60 of the first arms 54 are spaced slightly apart, such as by separation by a non-magnetic shim or the like, to form a non-magnetic gap 68 between the arms. The depth of this gap 68, called a front or primary gap, may be calculated from the length, in the direction of film transport, of the contact portions 64 in view of the known thickness of the magnetic portions of the arms 54 and the known angularity, or angular relationship, of the contact portion 64 with the lamination planes of the pole pieces 46, 48. The ends 66 of the second arms 56 are preferably disposed in face to face contact without a physical gap although, because of the interruption of the magnetic field across the contacting surfaces, a non-magnetic gap effect may be present. Thus, the contacting surfaces may be called a rear or secondary gap 70. The contact surface of this rear gap 70 is increased by angular engagement of the pole pieces 46, 48 at their angled ends 62 which contributes to core efficiency.

The recesses filled by the non-magnetic inserts 58 reduce the core thickness at the gap 68 and act to concentrate the magnetic field of the core 44 at this point. The non-magnetic inserts 58 help to support the remaining relatively thin magnetic lamination or laminations that make up the reduced thickness ends of the first arms and form the primary gap 64 both during the contouring process in which the flattened recording medium contact surfaces 64 are formed as well as subsequently in use. These inserts 58 are preferably made of metal such as aluminum or beryllium copper, although other non-magnetic materials may be used if desired.

Prior to assembly of the pole pieces 46, 48 in the case 12, one or more wire coils 72 are wound on the spaced portions 52 of the pole pieces which extend, in use, parallel to the film surface. In a preferred embodiment, each pole piece receives a read coil having half of the total turns desired and the two coils are connected in a series upon assembly of the pole pieces into the assembled core 44. In addition, one or both pole pieces may receive a separate coil for writing information on the associated film. When the appropriate coils are formed on the pole pieces and the pole pieces are assembled, to form the core 44, the assembly forms the first track-forming portion 26 as it is installed in the case 12 of the magnetic head 10. The various coils are then electrically connected through appropriate ducts or micro sleeving 74 with terminals 76 on the terminal boards 22, 24 at the outer end of the case 12.

Figure 6:
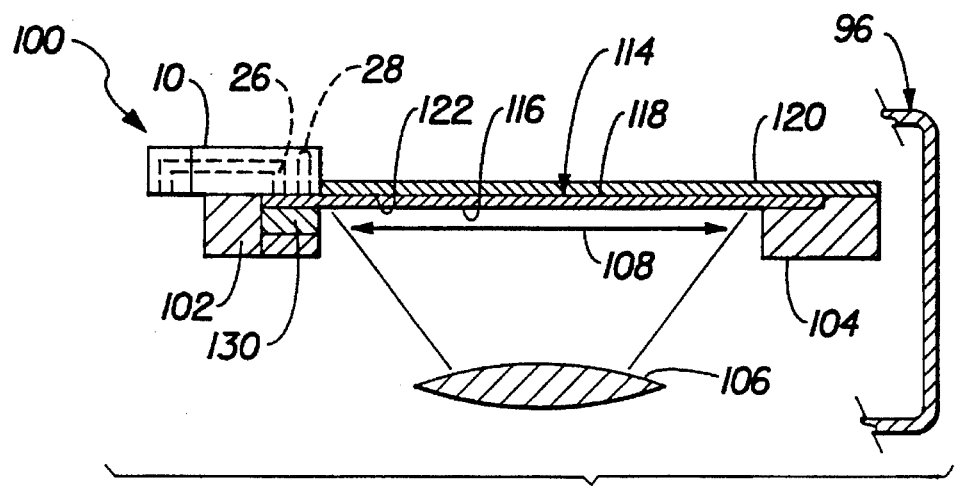
FIG. 6 is a partial side elevational view of a camera film gate having a magnetic head as shown in FIGS. 1 and 2.
Figure 7:
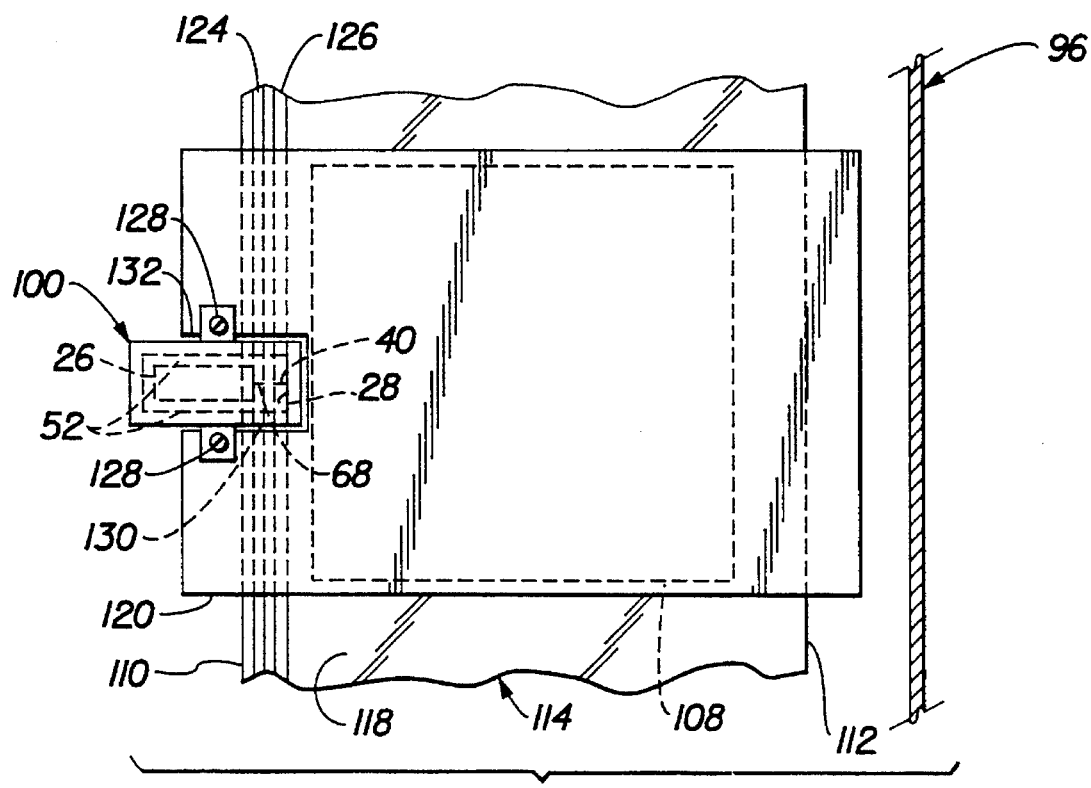
FIG. 7 is a partial plan view of the camera film gate shown FIG. 6.

Referring now to FIGS. 6 and 7, an exemplary application of the present invention is shown wherein the magnetic head 10 is positioned within a camera 96 loaded with film having a magnetic-memory layer. Those parts which are similar to those previously described utilize the same reference numerals for convenience.

A camera gate 100 is shown having a pair of inner rails 102, 104 that are positioned relative to a taking lens 106 in such a way that the photographic image area 108 is correctly aligned with respect to the edges 110, 112 of a film 114. The film 114, provided with a photosensitive surface 116 and a magnetic side 118 is flattened by a platen 120 to ensure that the photographic image is uniformly focused on the film's photosensitive surface.

The magnetic head 10 is attached to the platen 120 in such a way that the cores containing the gaps 68, 40 of the first and second track-forming portions 26, 28, respectively, are substantially planar with the lower surface 122 of the platen 120 and respectively aligned with tracks 124, 126 formed on the magnetic side 118 of the film. In this particular embodiment, a pair of fasteners 128 are used to secure the magnetic head assembly 10 to an upper surface of the platen 120. This mounting arrangement ensures that the gap regions of each of the track-forming portions 26, 28 are in physical contact with the tracks 124, 126 on the magnetic side 118 of the film 114, a condition that is necessary to achieve good reading and writing performance by the magnetic head. The physical contact between the track-forming portions 26, 28 and the magnetic side 118 of the film 114 is further guaranteed by the provision of a load pressure pad 130, which is positioned relative to the rail 102 so as to bear upon the photosensitive side 116 of the film 114 and thereby force the magnetic side 118 of the film against the track-forming portions 26, 28.

In order to obtain the desired planarity of the lower surfaces of the platen 120 and the magnetic head 10, a cutout portion 132 must be made in the platen. Encroachment of the cutout portion 132 into the portion of the platen 120 that is in contact with the film 114 is minimized when using the magnetic head assembly 10 herein described by arranging the spaced portions 52 of the core of the first track-forming portion 26 so that they are directed away from the image area 108 of the film 114. This arrangement requires that the first track-forming portion 26, that is, that portion capable of reading and writing information to and from the film magnetic side 118 be positioned furthest from the border of the photographic image area 108.

Reading is done as is conventionally known, by a magnetic flux change in the core 44 which is caused by the film 114 traveling across the non-magnetic gap 68 inducing a signal which is electromagnetically transformed by means of the coils 72 connected in series, to be transmitted as an electric signal to the camera via the terminals 76.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

PARTS LIST 10. inductive magnetic reproducing head
12. case
14. inner end
16. outer end
18. sides
20. arched contact surface
22. terminal board
24. terminal board
26. first track-forming portion
28. second track-forming portion
30. core
32. left pole piece
34. right pole piece
36. coils
38. one end (of core)
40. gap
42. central plane
44. core
46. left pole piece
48. right pole piece
50. laminations
52. spaced portions
54. first arm
56. second arm
58. non-magnetic insert
60. ends of first arms
62. ends of second arms
64. flat contact portions
66. second arm contact portion
68. primary (front) gap
70. rear (secondary) gap
72. coils
74. micro sleeving
76. terminals
96. camera
100. gate
102. inner rail
104. inner rail
106. taking lens
108. image area
110. edge
112. edge
114. film
116. photosensitive surface
118. magnetic side
120. platen
122. lower surface
124. track
126. track
128. fasteners
130. load pressure pad
132. cutout portion

What is claimed is:

1. A magnetic head for a camera for use with a film having a magnetic memory region wherein said head comprises a first track-forming portion for at least reading information from the magnetic memory region of said film, said track-forming portion including a core forming a magnetic circuit and having spaced areas generally parallel with the film for allowing wire to be wound thereon and a non-magnetic gap between the spaced areas, said core comprising a pair of pole pieces and said head being characterized in that:

each of said pole pieces is generally flat having first and second arms extending to one side from opposite ends of one of said spaced areas and lying generally in a common plane therewith, said arms each having an end; and in which said pole pieces are disposed at a substantial angle with said ends of their first and second arms, respectively, in closely opposed relation, said ends of said first arms being magnetically spaced to form said non-magnetic gap.

2. A magnetic head as recited in claim 1, wherein said first arms include recesses adjacent their ends for, reducing the thickness of the magnetic circuit at the gap and non-magnetic inserts retained in said recesses for supporting the reduced thickness circuit-forming portions of said ends.

3. A magnetic head as recited in claim 2, wherein said pole pieces are defined by a series of laminated portions and said recesses are formed by omitted portions of at least some of the lamination portions, said inserts being applied in place of the omitted lamination portions.

4. A magnetic head as recited in claim 3, wherein said inserts are cemented in said recesses.

5. A magnetic head as recited in claim 1, wherein said ends of the arms form an angle with said common plane that is less than 90 degrees.

6. A magnetic head as recited in claim 5, wherein the angle of the ends is substantially one-half of the angle between said pole pieces.

7. A magnetic head as recited in claim 6, wherein the angle of the ends of the arms is essentially 45 degrees.

8. A magnetic head as recited in claim 1, wherein the first arms have outer edges adjacent their ends which are contoured to form a recording medium contact surface for defining the thickness of the non-magnetic gap.

9. A core comprising a pair of pole pieces forming a magnetic circuit and having spaced areas for allowing wire to be wound thereon and a non-magnetic gap between the spaced areas for use with a camera film having a magnetic memory region, said core being characterized in that:

each of said pole pieces is generally flat having first and second arms extending to one side from opposite ends of one of said spaced areas and lying generally in a common plane therewith, said arms each having an end; and said pole pieces are disposed at a substantial angle with said ends of their first and second arms, respectively, in closely opposed relation, said ends of said first arms being magnetically spaced to form said non-magnetic gap.

10. A core as recited in claim 9, wherein said first arms include recesses adjacent their ends for reducing the thickness of the magnetic circuit at the non-magnetic gap and non-magnetic inserts retained in said recesses and supporting the reduced thickness circuit-forming portions of said ends.

11. A core as recited in claim 10, wherein said pole pieces are defined by a series of laminations and said recesses are formed by omitted portions of some of the laminations, said inserts being applied in place of the omitted lamination portions.

12. A core as recited in claim 11, wherein said inserts are cemented in said recesses.

13. A core as recited in claim 9, wherein said ends of the arms form an angle with said common plane that is less than 90 degrees.

14. A core as recited in claim 13, wherein said angle of the ends is substantially one-half of the angle between said pole pieces.

15. A core as recited in claim 14, wherein said angle of the ends of the arms is essentially 45 degrees.

16. A core as recited in claim 9, wherein the first arms have outer edges adjacent their ends which are contoured to form a recording medium contact surface and define the thickness of the non-magnetic gap.

17. A core as recited in claim 10, wherein the first arms have outer edges adjacent their ends which are contoured to form a recording medium contact surface for further defining the thickness of the non-magnetic gap.

* * * * *